Patented Feb. 22, 1938

2,109,250

UNITED STATES PATENT OFFICE 2,109,250

PROCESS FOR REDUCTION OF CONTAMINATION BY METALS IN CAUSTIC ALKALI SOLUTIONS

Albert H. Hooker, Lewiston, N. Y., assignor to Hooker Electrochemical Company, New York, N. Y., a corporation of New York No Drawing. Application November 29, 1933, Serial No. 700,361

4 Claims. (Cl. 23—184)

My invention relates to a process for reduction in contaminations as by iron, in aqueous solutions, such as solutions of caustic alkalis, and more particularly, of caustic soda.

In my co-pending application, Serial No. 689,955, now Patent No. 2,023,271, dated December 3, 1935, there is disclosed a process for reducing contamination in caustic soda solutions, for example, that have been concentrated in evaporators to about 50% by weight. Such solutions, as they come from the evaporators, may contain as much as 200 parts of iron per million parts of caustic soda, as well as traces of other metallic contaminants, such as manganese. If such solutions are further concentrated in fusion kettles to the anhydrous form, the iron may be reduced to 5 parts per million, this being the approximate limit of solubility of iron in fused anhydrous caustic soda. The iron thrown out of solution settles, but owing to imperfect separation, the fused product is apt to contain 7 to 10 parts of iron per million parts NaOH. When the fused caustic soda is redissolved in water, this iron remains in solution. This solution could, of course, be treated by the process of my above mentioned co-pending application, but the customer who buys and redissolves the fused product generally is not skilled in the art of purifying such solutions and has no facilities for doing so. My present invention, therefore, has for its object to disperse a suitable purification agent throughout the caustic alkali while in the fused state and thus to provide a simple process by which the customer who buys the product in its anhydrous form may, upon redissolving it, automatically obtain a solution of low iron content, without any manipulation requiring special apparatus or skilled supervision.

In my above-cited co-pending application, I have mentioned a number of agents, such as $Na_2CO_3$, $Na_2SO_4$, etc. which, in finely divided form are effective for removal of iron from caustic soda solutions by adsorption or otherwise. To this list I now add the essentially insoluble compounds of magnesium such as magnesite, consisting mostly of magnesium carbonate; calcined magnesite, consisting mostly of magnesium oxide; magnesium silicate, sulphate and chloride, also mixed salts such as calcium-magnesium carbonate or dolomite. Although more or less soluble, the chlorides and sulphates are included as these react with NaOH to produce sodium chloride or sulphate as the case may be and insoluble magnesium hydroxide. In general, any salt or compound of magnesium which, though itself soluble in water, reacts with the NaOH or $Na_2CO_3$, which is always present, to form insoluble compounds, is suitable for my purpose.

In the carrying out of my process I add a suitable quantity such as about one-tenth of one per cent of suitable absorption material such as the magnesium material mentioned, to the fusel caustic soda, in the fluid state, at or above the temperature of fusion, i. e., 318° C., and containing 5 to 10 parts iron per million parts of NaOH, and maintain it in suspension as the caustic soda is pumped into the steel drums and allowed to cool and solidify for shipment.

At the customer's plant, such caustic soda will be redissolved in water to make up a solution of from 10 to 50% caustic soda by weight. In the course of redissolving the caustic soda it will be agitated and the magnesium or other material brought into intimate contact with the solution. Such a solution of caustic soda, to which has been added magnesium material in accordance with my present process, will be found to be slightly turbid. Upon standing for about three days, however, the solution will be found to have settled clear, and a whitish precipitate will appear on the bottom of the container. This precipitate is easily removable and will be found to contain most of the iron. In a typical case, in which the original caustic soda contained 6 parts iron per million, treated solutions of various dilutions were found, after settling, to have the following iron content:

| Solution, per cent NaOH | Parts Fe per million NaOH | Parts Fe per million of solution |
|---|---|---|
| 50 | 1.82 | 0.91 |
| 30 | 2.43 | 0.76 |
| 18 | 4.28 | 0.77 |
| 10 | 6.80 | 0.68 |

It will be noted that the greatest reduction of iron occurred in the 50% solution and in the progressively weaker solutions the reduction was correspondingly less. In the case of the 10% solution there was no reduction of iron. This is probably because the compounds formed by the iron with the removal agent are appreciably soluble in such solutions at ordinary temperatures, which would, of course, reduce the effectiveness of my treatment in weak solutions. For best results, therefore, the caustic soda should be first made up into a 50% solution, which is practically a saturated solution at ordinary temperature. It is not practicable to go to a higher concentration than this, as 52% caustic soda solution solidifies at 21° C. If it is desired to use the caustic soda in a weaker dilution than 30 per cent it should be treated and clarified in the 50% concentration and afterward diluted to the desired strength. If this is done the iron content per unit of caustic soda will be the same in the dilute solution as in the 50% solution, or about .3 of the iron content in the original caustic soda. 30 per cent solutions may be treated and clarified with good results, but better results can be obtained by dilution from a 50% treated solution. My process is therefore for practical purposes effective within the limits of 60 to 100 per cent of saturation.

It should also be noted that the solution made by dissolving caustic soda in water will be quite warm from the heat of solution, but upon standing and settling will reach room temperature. This is important, as the compounds formed by the iron with the removal agent are much more soluble in warm than in cool solutions, and the process is correspondingly less effective in warm solutions. For best results, the solution should be clarified below 30° C.

It will be seen, therefore, that when solid fused caustic soda has been made up into a 50% solution containing magnesite or other essentially insoluble magnesium material, and settled for three days, or otherwise clarified at a temperature below 30° C. the iron content is reduced from 5 to 10 parts per million to from 1½ to 3 parts per million and this low iron content may be maintained in weaker solutions by diluting after treatment.

The reduction in iron content is, however, considerably greater than these figures would seem to indicate, since the caustic soda, when untreated by my process, generally picks up more iron from the containers during the process of redissolving it, so that if untreated it is apt to contain 7 to 12 parts of iron per million of caustic, as compared with 1½ to 3 parts if treated by my process.

During fusion of the caustic soda or other alkali in the iron fusion kettles generally employed for this purpose, sensible quantities of other contaminants, such as manganese, are picked up. My process is quite effective for removal of these also.

It will be obvious that my process is not limited to caustic soda, but is equally applicable to caustic potash, etc.

Asbestos fibre is a magnesium compound that may be used with good results, since although not pulverized, it has a high ratio of surface to volume.

Instead of allowing the solution to settle, it may, after treatment by my process, and cooling to 30° C. or lower, be clarified by any other convenient method, such as filtering or centrifuging.

I claim:

1. The process of preparing commercial solid, substantially anhydrous caustic alkali which, upon dissolving the same in water to make up a 60 to 100 percent saturated solution thereof, allowing said solution to cool and settle and separating the solution from the sludge, will automatically produce a solution of relatively low iron content, which process comprises adding a small quantity of finely divided asbestos fiber to caustic alkali of relatively high iron content while said caustic alkali is in fused condition and allowing said caustic alkali to cool and solidify.

2. As a new article of commerce, solid, substantially anhydrous caustic alkali containing a small quantity of finely divided asbestos fiber.

3. A process of preparing commercial, solid, substantially anhydrous caustic soda, which upon dissolving the same in water to make up a sixty to one-hundred per cent saturated solution thereof, allowing the said solution to cool and settle and separating the solution from the sludge, will automatically produce a solution of relatively low iron content, which process comprises adding a small quantity of finely divided asbestos fiber to caustic soda of relatively high iron content while said caustic soda is in a fused condition and allowing said caustic soda to cool and solidify.

4. As a new article of commerce, solid, substantially anhydrous caustic soda containing a small quantity of finely divided asbestos fiber.

ALBERT H. HOOKER.